US010977199B2

(12) United States Patent
Suri et al.

(10) Patent No.: US 10,977,199 B2
(45) Date of Patent: Apr. 13, 2021

(54) MODIFYING NVME PHYSICAL REGION PAGE LIST POINTERS AND DATA POINTERS TO FACILITATE ROUTING OF PCIE MEMORY REQUESTS (71) Applicant: Marvell Asia Pte, Ltd., Singapore (SG)

(72) Inventors: Salil Suri, Fremont, CA (US); Yingdong Li, Palo Alto, CA (US); Szu-Hsien Ho, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/532,186

(22) Filed: Aug. 5, 2019

(65) Prior Publication Data
US 2020/0050558 A1 Feb. 13, 2020

Related U.S. Application Data (60) Provisional application No. 62/716,284, filed on Aug. 8, 2018.

(51) Int. Cl.
*G06F 13/16* (2006.01)
*G06F 13/42* (2006.01)
(52) U.S. Cl.
CPC ...... *G06F 13/1668* (2013.01); *G06F 13/4282* (2013.01); *G06F 2213/0026* (2013.01)
(58) Field of Classification Search
CPC .............. G06F 13/1668; G06F 13/4282; G06F 2213/0026
See application file for complete search history.

(56) References Cited

U.S. PATENT DOCUMENTS

| 6,804,766 | B1 * | 10/2004 | Noel ........................ G06F 12/08 711/203 |
| 8,966,164 | B1 | 2/2015 | Asnaashari et al. |
| 9,842,075 | B1 | 12/2017 | Davis et al. |
| 9,934,173 | B1 | 4/2018 | Sakalley et al. |
| 2008/0126547 | A1 * | 5/2008 | Waldspurger ......... G06F 3/0604 709/226 |

(Continued)

FOREIGN PATENT DOCUMENTS

WO    WO-2015/080690 A1    6/2015

OTHER PUBLICATIONS

Extended European Search Report in European Patent Application No. 19190677.5, dated Dec. 9, 2019 (7 pages).

(Continued)

*Primary Examiner* — Henry Tsai
*Assistant Examiner* — John B Roche (57) ABSTRACT A first command is received from a virtual or physical host associated with a storage system which includes two or more hosts. The first command comprises one or more physical request page (PRP) entries associated with the non-volatile memory express (NVMe) standard. The one or more PRP entries are modified with an indication of the virtual or physical host. A second command is sent with the modified one or more PRP entries to a solid state drive (SSD). A memory request is received from the SSD, where the memory request comprises the modified one or more PRP entries. The memory request is routed to the virtual or physical host based on the indication of the virtual or physical host in the modified one or more PRP entries.

23 Claims, 6 Drawing Sheets (56) References Cited

U.S. PATENT DOCUMENTS

| | | | |
|---|---|---|---|
| 2012/0014386 A1* | 1/2012 | Xiong | H04L 29/12028 |
| | | | 370/392 |
| 2012/0110233 A1 | 5/2012 | Higuchi et al. | |
| 2015/0248366 A1* | 9/2015 | Bergsten | H04L 67/1097 |
| | | | 710/308 |
| 2015/0317088 A1 | 11/2015 | Hussain et al. | |
| 2016/0127492 A1 | 5/2016 | Malwankar et al. | |
| 2017/0286363 A1 | 10/2017 | Joshua et al. | |
| 2018/0074757 A1 | 3/2018 | Yamaguchi et al. | |

OTHER PUBLICATIONS

Communication pursuant to Article 94(3) EPC in European Patent Application No. 19190677.5, dated Feb. 22, 2021 (4 pages).

* cited by examiner

MODIFYING NVME PHYSICAL REGION PAGE LIST POINTERS AND DATA POINTERS TO FACILITATE ROUTING OF PCIE MEMORY REQUESTS

CROSS REFERENCE TO RELATED APPLICATION

This disclosure claims the benefit of priority of U.S. Provisional Application Ser. No. 62/716,284 filed Aug. 8, 2018, entitled, "METHOD AND APPARATUS FOR IN-LINE PROCESSING OF AN NVMe PRP LIST DURING THE PCIe FETCH OPERATION", the contents of which is incorporated herein by reference in its entirety.

FIELD OF USE

This disclosure relates to providing storage services to two or more hosts which may be virtual hosts and/or physical hosts, namely modifying physical region pages (PRP) data pointers and list pointers associated with the Non-Volatile Memory Express (NVMe) standard to facilitate routing of Peripheral Component Interconnect Express (PCIe) memory requests to one of the two or more hosts.

BACKGROUND

PCI Express (Peripheral Component Interconnect Express), officially abbreviated as PCIe or PCI Express, is a high-speed serial computer expansion bus standard. PCI Express operates as a motherboard-level interconnect between a host and peripheral components such as attached solid state drives (SSD). Non-Volatile Memory Express, also known as NVMe or NVM Express, is used to manage data stored on the SSDs by providing a command set for SSD access. The host sends NVMe commands to the SSDs to store and retrieve data from the SSDs. The commands utilize Physical Region Pages (PRP) entries to denote buffer locations in host memory. A PRP entry takes the form of a data pointer to data or a list pointer to a list of data pointers similar to a linked list. The SSD, while executing the command, may request data movement associated with a PRP entry such as a PCIe memory read request. When a single host is associated with the SSDs, routing of the PCIe memory read request is straightforward. The PCIe memory read request is sent to the single host. When two or more hosts such as physical hosts and/or virtual hosts are associated with the SSDs, routing the PCIe memory read request becomes more complex. The PRP entry provides no indication of which host of the two or more hosts is associated with PRP entry which would otherwise facilitate routing to that host.

SUMMARY

This disclosure relates to a Non-Volatile Memory Express (NVMe) switch which facilitates NVMe-based access by one of two or more hosts which may be physical hosts and/or virtual hosts to a plurality of Solid State Drives (SSD). The NVMe switch modifies a physical region page (PRP) entry of an NVMe command such as a data pointer or list pointer with a host ID or virtual function (VF) ID associated with a host which sent the NVMe command to the NVMe switch and a tag which indicates the PRP entry is a data pointer or a list pointer. The host ID or VF ID facilitates routing of Peripheral Component Interconnect Express (PCIe) memory requests with the modified PRP data pointer or list pointer to one of the two or more hosts associated with the NVMe command to perform the PCIe memory request.

According to an aspect of the described system and techniques, a method comprises: receiving a first command from a host associated with a storage system which includes two or more hosts, wherein the first command comprises one or more physical request page (PRP) entries associated with the non-volatile memory express (NVMe) standard; modifying the one or more PRP entries with an indication of the host; sending a second command with the modified one or more PRP entries to a solid state drive (SSD); receiving a memory request from the SSD, wherein the memory request comprises the modified one or more PRP entries; and routing the memory request to the host based on the indication of the host in the modified one or more PRP entries.

According to another aspect of the described system and techniques, non-transitory computer-readable medium storing instructions that, when executed by one or more processors, cause the one or more processors to at least: receive a first command from a host associated with a storage system which includes two or more hosts, wherein the first command comprises one or more physical request page (PRP) entries associated with the non-volatile memory express (NVMe) standard; modify the one or more PRP entries with an indication of the host; send a second command with the modified one or more PRP entries to a solid state drive (SSD); receive a memory request from the SSD, wherein the memory request comprises the modified one or more PRP entries; and route the memory request to the host based on the indication of the host in the modified one or more PRP entries.

According to yet another aspect of the described system and techniques, a non-volatile memory express (NVMe) switch comprises: a command processor comprising instructions stored in memory of the NVMe switch that, when executed by one or more processors of the NVMe switch, cause NVMe switch to at least: receive, by the command processor, a first command from a host associated with a storage system which includes two or more hosts, wherein the first command comprises one or more physical request page (PRP) entries associated with the non-volatile memory express (NVMe) standard; modify, by the command processor, the one or more PRP entries with an indication of the host; and send, by the command processor, a second command with the modified one or more PRP entries to a solid state drive (SSD); and a data processor comprising instructions stored in memory of the NVMe switch and that, when executed by one or more processors of the NVMe switch, cause the NVMe switch to at least receive, by the command processor, a memory request from the SSD, wherein the memory request comprises the modified one or more PRP entries; and route the memory request to the host based on the indication of the host in the modified one or more PRP entries In this regard, the NVMe switch allows for routing PCIe memory requests associated with an NVMe command generated by a host when a storage system includes two or more hosts. The PCIe memory requests are routed to the host.

BRIEF DESCRIPTION OF THE DRAWINGS

The drawings are for the purpose of illustrating example embodiments, but it is understood that the embodiments are not limited to the arrangements and instrumentality shown in the drawings.

DETAILED DESCRIPTION

This disclosure relates to a Non-Volatile Memory Express (NVMe) switch which facilitates NVMe-based access by one of two or more hosts to a plurality of Solid State Drives (SSD). A host as referred to herein may be either a physical host or a virtual host such as a virtual machine (VM). The NVMe switch modifies a physical region page (PRP) entry of an NVMe command such as a data pointer or list pointer with a host ID or virtual function (VF) ID associated with a host which sent the NVMe command and a tag which indicates the PRP entry is a data pointer or a list pointer. The host ID or VF ID facilitates routing of Peripheral Component Interconnect Express (PCIe) memory requests with the modified PRP data pointer or list pointer to one of the two or more hosts associated with the NVMe command. The principles described herein may be applied to controlling performance of other type of storage, such as a hard disk drive (HDD) or hybrid SSD/HDD drives.

Figure 1A:
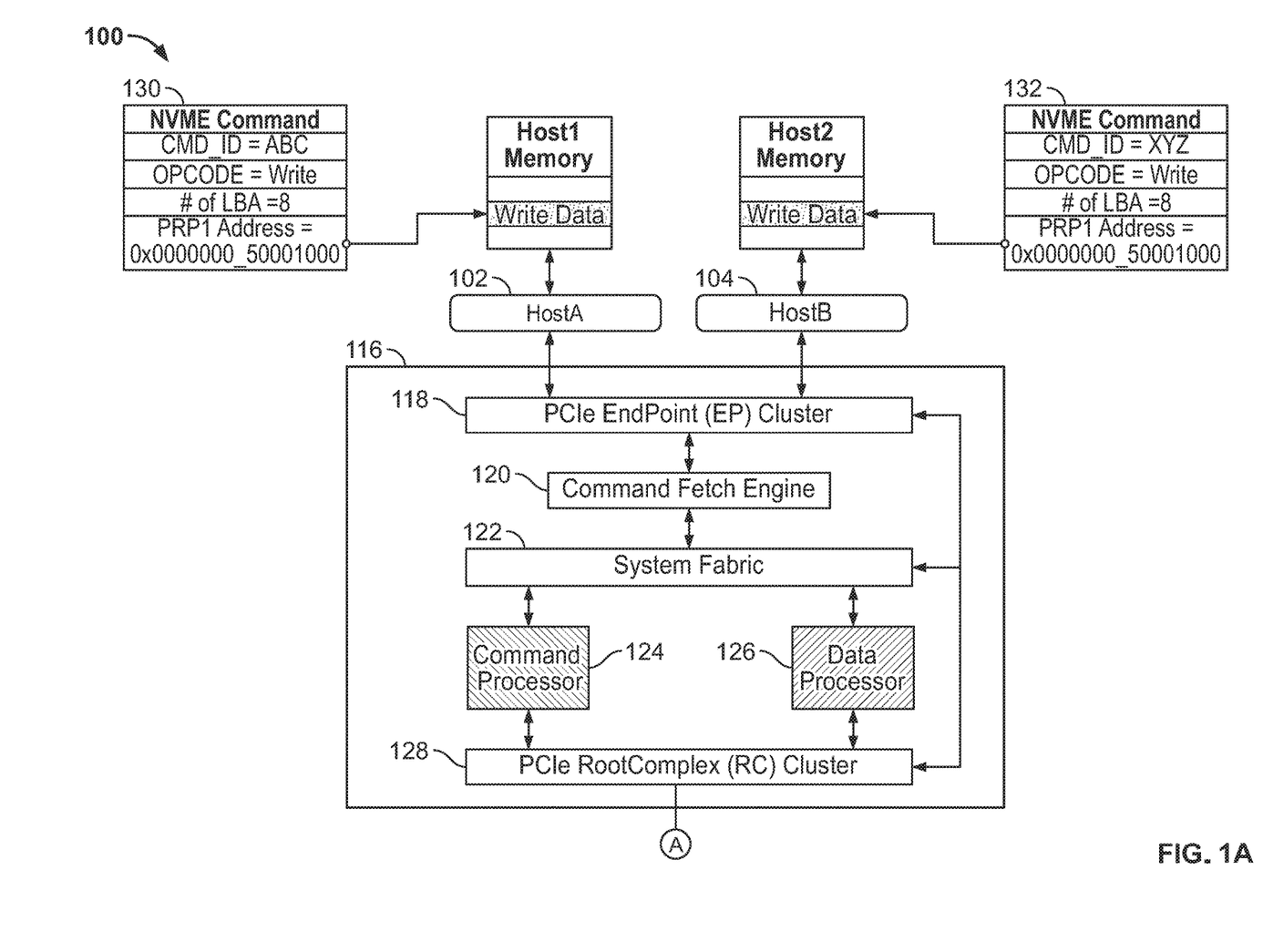
FIGS. 1A and 1B illustrate an example storage system which facilitates processing of Physical Region Pages (PRPs) when the storage system includes two or more hosts.
Figure 1B:
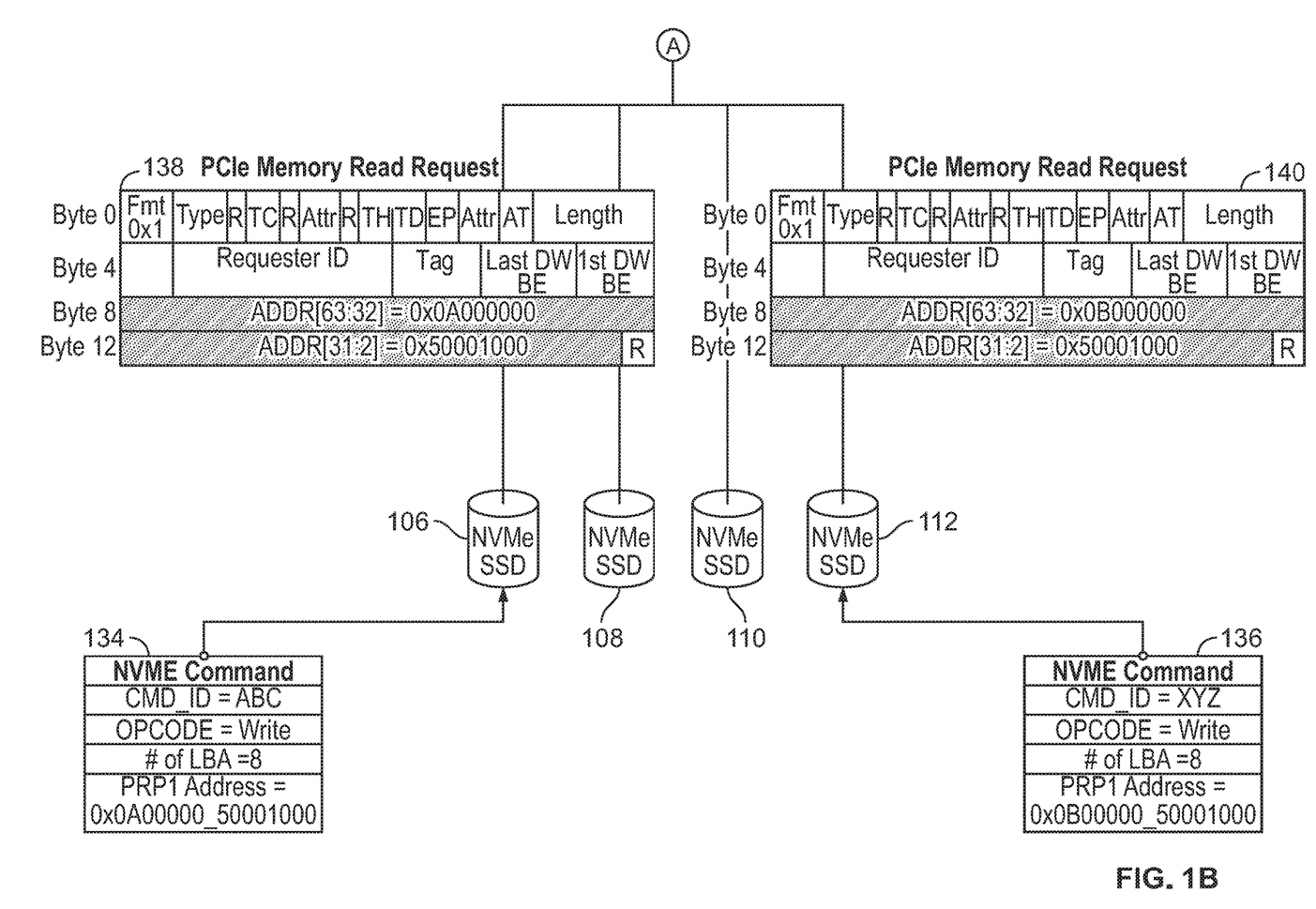

FIGS. 1A and 1B illustrate an example storage system to facilitate processing of Physical Region Pages (PRPs) when the storage system includes two or more hosts. The example storage system spans FIGS. 1A and 1B for ease of illustration, where reference A interconnects structure associated with the two figures. The example storage system 100 may include the two or more hosts, shown as host 102 and host 104, one or more solid state drives (SSDs) shown as SSDs 106-112, and an NVMe switch 116. The two or more hosts 102-104 may work as servers offering information resources, services, and/or applications to users or other nodes on a network. In some examples, a host may be an actual physical host. In other examples, the host may be a virtual machine (VM) or virtual host. The VM or virtual host may be implemented on the actual physical host using a PCIe single root input/output virtualization (SR-IOV) and associated with a virtual function (VF). The SSD is an integrated circuit (IC) based storage mechanism which can store data persistently to enable the host to provide needed functionality. The SSDs 106-112 are capable of providing higher bandwidth and lower latency compared to hard drives. The NVMe switch 116 may be positioned in between the hosts 102-104 and the SSDs 106-112. The NVMe switch 116 controls PCIe based point-to-point switch connections between the hosts 102-104 and SSDs 106-112, so that every SSD 106-112 has its own dedicated connection to the hosts 102-104.

The NVMe switch 116 includes a PCIe endpoint cluster 118, a command fetch engine 120, a system fabric 122, a command processor 124, a data processor 126, and a PCIe Root Complex (RC) cluster 128. The PCIe endpoint cluster 118 may be coupled to the two or more hosts 102-104. NVMe is used to manage the data stored on the SSDs 106-112 by providing a command set for SSD access. In examples, the two or more hosts 102-104 may implement a queue pair in accordance with NVMe to facilitate the SSD access. The queue pair consists of a submission queue and a completion queue. For example, a host may generate an NVMe command to fetch data stored in the SSD or store data in the host's memory to the SSD. When the command is executed by the SSD, a completion notifying execution of the command may be stored in the completion queue. Command 130 is an example of the command placed on the submission queue by host 102 and command 132 is an example of the command placed on the submission queue by host 104. Each command may be associated with an example command type shown by OPCODE, be associated with an example data operation size shown as "# of logical block addresses (LBAs)", and include a Physical Region Pages (PRP) entry with a PRP address to identify as a pointer where data or a list is located in a memory domain of the host. Commands conforming to NVMe may utilize the PRP entry to identify data associated with the fetching and storing operations.

Two PRP entries are typically associated with the PRP entry although only one PRP is shown in commands 130, 132. The PRP entries may be identified as PRP1 and PRP2. The PRP1 entry may be a PRP data pointer which points to data stored in the host which may be 4K of data in some examples. The data pointer may have a PCIe address of host memory where the data is stored. The PRP2 entry may also have a PRP data pointer or PRP list pointer. If the PRP2 entry is a data pointer, then the PRP2 entry points to a data stored in the host which may be 4K of data such that PRP1 entry and PRP2 entry allow for an 8K operation to be performed. If the PRP2 entry is a list pointer, then the PRP2 entry points to a list of pointers stored in the host. The list pointer may have a PCIe address of the host memory where data pointers 2 through n are stored or a combination of data pointers and list pointers.

A PCIe connection between the two or more hosts and the NVMe switch 116 may comprise 2, 4, 8, or 16 data transmission lanes. Each transmission lane may comprise two pairs of wires, one pair for transmitting and one pair for receiving. The two or more hosts may be coupled to the NVMe switch 116 via the PCIe connection, such that each of the two or more hosts may be uniquely addressable by a PCIe address. The two or more hosts may be actual physical hosts or include VMs. The command fetch engine 120 may fetch the command from the two or more hosts which are then forwarded to the command processor 124 via a system fabric 122 or cross-bar switch though internal nodes of the NVMe switch 116. For example, the command fetch engine 120 fetches commands from NVMe submission queues in host memory into local memory of the NVMe switch 116 for processing. The command fetch engine 120 facilitates transporting a queue entry submitted by a host CPU in a host memory queue to a local memory queue for processing by a local CPU. The command processor 124 determines which SSD each command is to be forwarded to and the PCIe RC cluster 128 then provides the command to the determined SSD. For example, the command 130 associated with host 102 may be sent to SSD 106 while command 132 associated with host 104 may be sent to SSD 112.

Each SSD which receives a command may generate a PCIe memory request based on the command that was received. The NVMe switch 116 may receive this request for routing to the host which generated the command associated with the request. The PCIe memory request may include the PRP entry of the command. The PRP entry may include a 64 bit PCIe address to identify where the data or list is located in a memory domain of a host, but it may not normally indicate the host associated with the PRP entry. The indication of the host which generated the PRP entry is needed because the NVMe switch 116 needs to route the PCIe memory request with the PRP entry to the host who generated the PRP entry to perform the PCIe memory request.

In examples, the command processor 124 embeds an indication of the host before sending the command from the host to the SSD to facilitate this routing. The indication is embedded in the PRP address associated with a command which is sent from the command processor 124 to the SSD via the PCIe RC cluster 128. For example, command 134 associated with host 102 and command 136 associated host 104 sent to SSDs 106, 112 may have different PRP addresses (shown as "0A" and "0B" in upper bits or specifically the upper 2 octets) to indicate that each command is associated with different hosts when received by respective SSDs. When the SSD sends a PCIe memory request with the PRP entry to the NVMe switch 116 to retrieve data from a host associated with the PRP entry, the SSD includes the indication of the host in the PCIe memory request sent to the NVMe switch 116 so that the NVMe switch 116 has a host ID (i.e., host identifier) for a physical host or VF ID (i.e., virtual function identifier) for a virtual host or VM. For example, PCIe memory read request 138 generated by SSD 106 and PCIe memory read request 140 generated by SSD 112 have PRP entries with indications of the hosts which were embedded by the command processor. The data processor 126 sends the PCIe memory request via the PCIe EP cluster 118 to the appropriate host to perform the operation. For example, the PCIe memory request may be routed to a host based on the host ID and/or VF ID in a PRP entry and, as shown, PCIe memory read request 138 is routed to host 102 and PCIe memory read request 140 is routed to host 104. The embedded host identification allows the data processor to know where to route the PCIe memory request so as to reach the host which can execute the PCIe memory request. Further, the data processor 126 may tag the list of pointers resulting from the PCIe memory request with information associated with whether it is a data pointer or list pointer and the host ID and/or VF ID. In some examples, the host ID or VF ID may be considered a tag as well.

Example Operations

Figure 2:
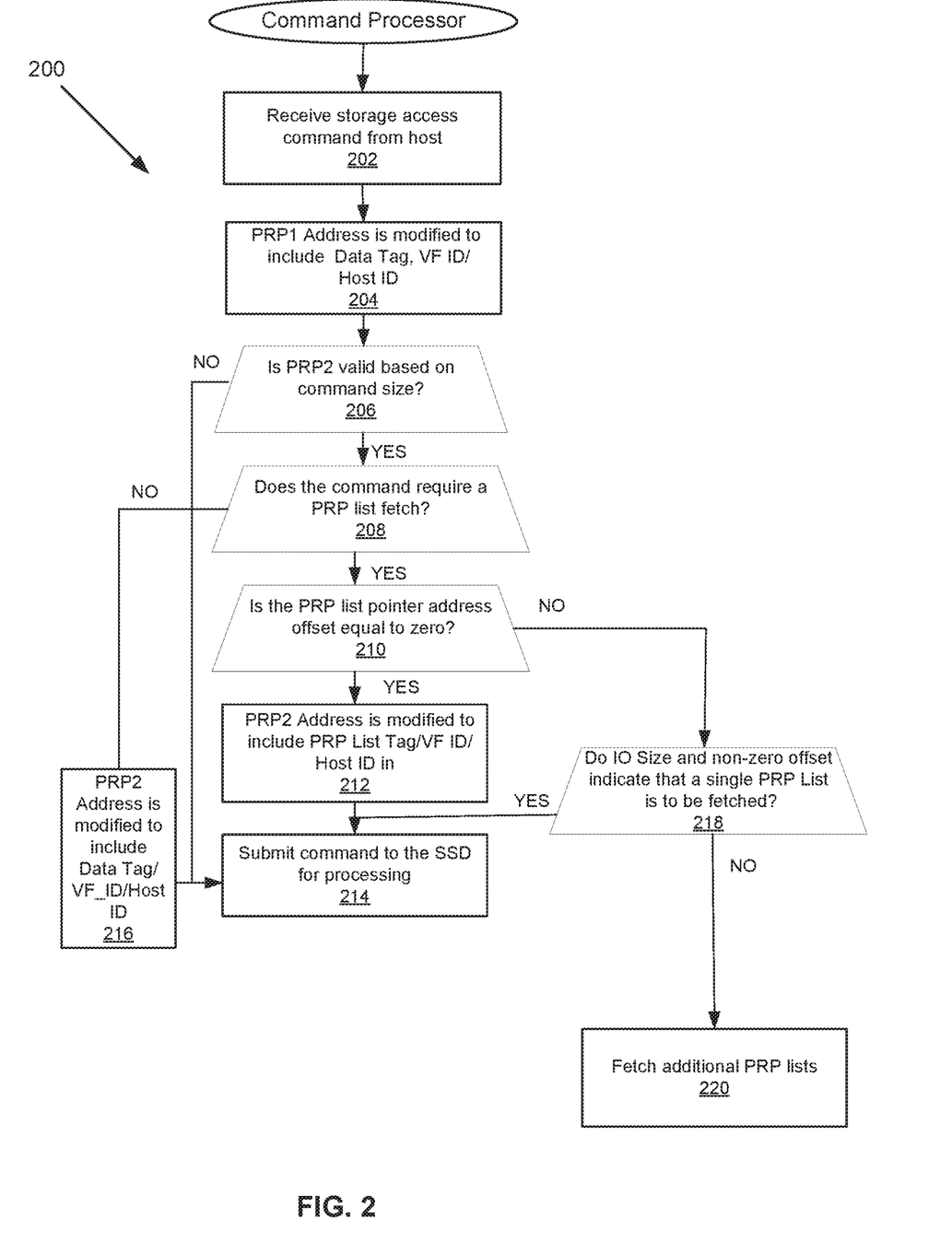
FIG. 2 is an example flow chart of functions associated with processing a PRP entry associated with a Non-Volatile Memory Express (NVMe) command received from one of the two or more hosts.

FIG. 2 is an example flow chart 200 of functions associated with processing a PRP entry associated with an NVMe command received from one of two or more hosts. The functions facilitate the subsequent routing of a PCIe memory request to the host which sent the NVMe command, where the PCIe memory request is received from an SSD to retrieve data or a list of pointers associated with the PRP entry in the NVMe command. The functionality may be performed via the command processor in firmware, software, hardware, or a combination or hardware, software, and/or firmware.

At 202, a storage access command may be received from the host. The storage access command may be an NVMe command to read data from the SSD or to write data to the SSD. The NVMe command may include two PRP entries, referred to as PRP1 and a PRP2. PRP1 may be a data pointer and the PRP2 may be a data pointer or a list pointer. The pointers may be addresses to host memory having the data and/or list of data pointers.

At 204, the address of PRP1 is modified to include an indication that is associated with a data pointer and an indication of the host associated with PRP1. A tag may be inserted into PRP1 to indicate that it is associated with a data pointer. For example, the tag may be a unique set of bits which indicates that PRP1 is associated with a data pointer. The NVMe command may be associated with metadata which indicates which host sent the command. This metadata may be indicated by routing information that was used to send the NVMe command from the host to the NVMe switch. PRP1 may be modified to include host ID to indicate the host which sent the NVMe command. In some examples, PRP1 may be modified to include a virtual function (VF) ID. The VF ID may indicate a VM or virtual host to uniquely identify the VM or virtual host. The data tag, VF ID, and/or host ID may be inserted in many ways. For example, upper address bits of the address associated with PRP1 may be unused or reserved which are replaced with the data tag and the host associated with the PRP1 such as the VF ID and/or host ID. The NVMe switch may store a copy of the bits that were replaced.

At 206, a determination is made whether PRP2 is valid. Validity of the PRP2 entry may be based on a product of an input/output (I/O) size associated with the command indicated in some examples by the "# of LBA" entry in the NVMe command and a size of an LBA which may be a fixed value established during configuration of the host. The I/O size indicates an amount of data associated with data pointers referred to by PRP1 and PRP2. For example, if the I/O is 4K, PRP1 may be sufficient to point to the data associated with the NVMe command. PRP2 does not point to any additional data pointers or list of data pointers since the data is identified by PRP1 and is not valid. At 214, the NVMe command with the modified PRP1 is provided to the SSD for processing if PRP2 is not valid.

If the I/O is greater than 4K, then PRP2 is valid and at 208, a determination is made whether PRP2 is a data pointer or list pointer. For example, PRP2 may be a list pointer to list of data pointers if the I/O size is greater than 8K or a data pointer if the I/O size is greater than 4K but less than 8K. If the PRP2 is a data pointer, then at 216, the address of PRP2 is modified to include an indication that is associated with a data pointer such as a data tag and VF ID and/or host ID which sent the NVMe command with PRP2. If PRP2 is a list pointer, then at 210, a determination is made whether there is a memory offset in host memory where the list starts. If there is no offset, then at 212, the address of PRP2 is modified to include an indication that is associated with a list pointer such as a PRP list tag and the VF ID and/or host ID. For example, upper address bits of the address associated with PRP2 may be unused or reserved which are replaced with the PRP list tag when PRP2 is a list pointer and the host ID. The NVMe switch may store a copy of the bits that were replaced. Then, at 214, the NVMe command with the modified PRP2 is submitted to the SSD for processing.

If the offset is not equal to zero, the PRP2 may indicate that the list pointers in host memory may further refer to another list pointer. If another list pointer is referenced at 218, then processing continues to block 220 to retrieve the other list and perform functions similar to 206-218. If no list is referenced at 218, then processing continues to block 212, 214.

The determination whether PRP2 is associated with another list pointer may be based on the I/O size and offset. To illustrate, a list of data pointers may be no greater than 512 data pointers where each data pointer is 8 bits so that the list of pointers would fit in the 4K buffer associated with PRP2. If each data pointer further points to 4K of data, then 2 MB of data is associated with PRP2. If the I/O size associated with the command is less than or equal to a sum of 2 MB and the 4K associated with PRP1, then the list pointer in PRP2 may not point to another list pointer. If the I/O size is still greater with a non-zero offset, then the list pointer in PRP2 may point to another list pointer.

The SSD may process the NVMe command received from the NVMe switch. In processing the NVMe command, the SSD may send a PCIe memory request to the NVMe switch with the PRP entry in the NVMe command. The PCIe memory request may be to retrieve data associated with a data pointer indicated by the PRP entry or retrieve data pointers associated with a list pointer indicated by the PRP entry. The data pointer or list pointer may point to memory in the host associated with the NVMe command that was processed. Further, the PRP entry in the PCIe memory request may include the data tag or PRP list tag to indicate whether the PRP entry is associated with a data pointer or a list of data pointers and the VF ID and/or host ID associated with the NVMe command which was processed.

Figure 3:
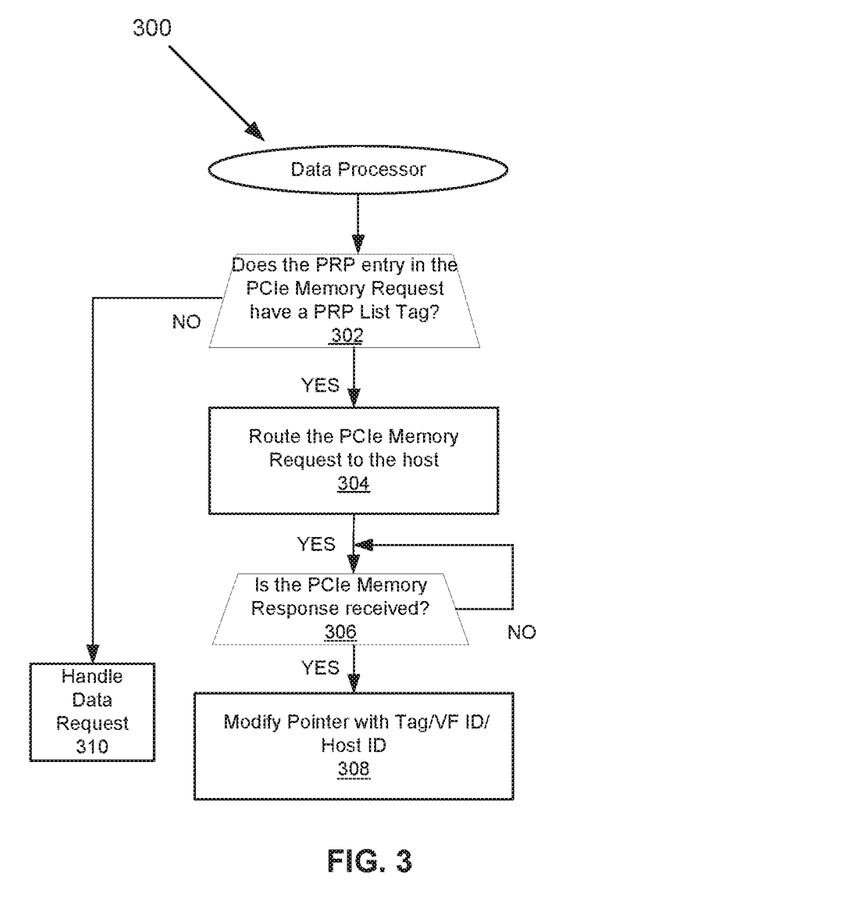
FIG. 3 is an example flow chart of functions associated with handling a PCIe memory request from the SSD.

FIG. 3 is an example flow chart 300 of functions associated with handling a PCIe memory request from the SSD. The processing may be performed by the data processor and implemented in hardware, software, firmware, or a combination thereof.

The PCIe memory request provided by the SSD may have a PRP entry. The PRP entry includes the data tag or PRP list tag, and host ID and/or VF ID which were previously embedded in the PRP entry by the NVMe switch when the NVMe command associated with the PCIe memory request was sent to the SSD. This information may be used to route the PCIe memory request.

At 302, a determination is made whether the PRP entry has a data tag in the address which indicates that it is associated with a data pointer.

If the PRP entry has a data tag, the PRP entry is associated with a data pointer. The host is identified from the host ID or VF ID in the PRP entry and the bits which were previously replaced by the NVMe switch in the PRP entry are reinserted back into the PRP entry. At 310, the PCIe memory request is routed to the host to perform the PCIe memory request to retrieve the data associated with the data pointer which is then provided to the SSD in a PCIe memory response received from the host.

If the PRP entry has a PRP list tag, then the PRP entry is associated with a list pointer. The host is identified from the host ID or VF ID in the PRP entry and the bits which were previously replaced by the NVMe switch in the PRP entry are reinserted back into the PRP entry. At 304, the PCIe memory request is routed to the host so that the host performs the PCIe memory request to retrieve the list of data pointers associated with the list pointer. In some cases, the PRP entry may also include a VF ID which is then used to further route the PCIe memory request to a VM or virtual host. At 306, the NVMe switch waits for a PCIe memory response to the PCIe memory request which indicates that the list of pointers is received from the host. Upon receiving this completion, at 308, the pointers in the list of pointers are modified to include data tags, PRP list tags, and/or host IDs to indicate that each of the pointers points to data or a list of pointers and to indicate the host associated with the data pointer or list pointer in a manner similar to what is described in block 204, 212, 216 above. In some cases, the PRP entry may include a VF ID. Then, the list of modified pointers is provided to the SSD. The data tags, PRP list tags, host IDs, and/or VF IDs are used by the NVMe switch to route the pointer to the host associated with the pointer when the SSD sends a PCIe memory request to access the pointers.

In some examples, a last entry of the list of pointers may be a list pointer which points to another list of data pointers. The data processor may examine each 8 bytes or some other amount of data in the list of pointers of the PCI response received from the host. If data in the list of pointers is a list pointer, then the pointer is tagged with a PRP list tag. The VF ID and/or host ID associated with where the list of pointers was retrieved from is included in the pointers to facilitate subsequent retrieval by the SSD of data or additional lists of pointers pointed by the pointers.

Figure 4:
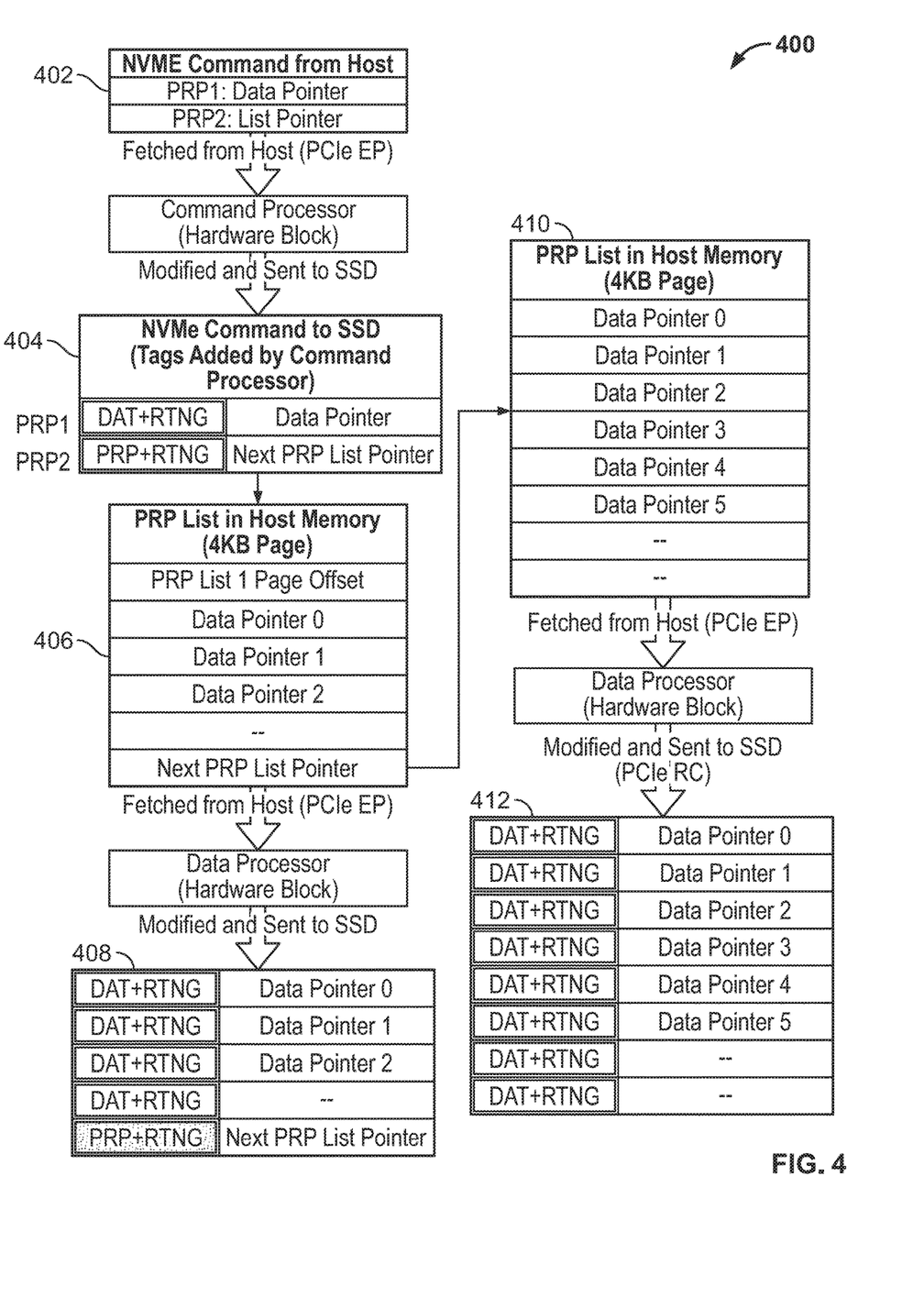
FIG. 4 illustrates example processing to modify a PRP entry associated with the NVMe command and to retrieve and modify associated data pointers and/or list pointers associated with a list of pointers retrieved from a host based on the PRP entry.

FIG. 4 is an example flow chart 400 illustrating processing to modify the PRP entry associated with the NVMe command and to retrieve and modify associated data pointers and/or list pointers retrieved from a host based on the PRP entry. The PRP entries may be indicated by an NVMe command 402 fetched from the host which in this example includes a PRP1 data pointer and a PRP2 list pointer. The command processor may modify the PRP1 entry and PRP2 entry to indicate tags which identify the host ID/VF ID ("RTNG" or routing) and whether the PRP entry is a data pointer ("DAT") or a list pointer ("PRP"). The modified NVMe command is shown as command 404. The SSD may send a PCIe memory request to the NVMe switch to fetch the list of pointers ("PRP List") from the host. This list of pointers 406 may be fetched from the host by the data processor and modified to indicate whether the pointers are associated with data pointers ("DAT") or list pointers ("PRP"). The pointers in the list may be also associated with the host ID and/or VF ID ("RTNG") where the list of pointers was fetched from. The modified list of pointers is provided as list 408.

In some examples, the list of pointers 406, 408 may include an entry of a list pointer (shown as "Next PRP List Pointer") which points to another list pointer in the host memory. The data processor may detect this list pointer and fetch the list of pointers associated with the list pointer which is shown as list of pointers 410. The data processor may modify the pointers to indicate whether the pointers are associated with a data pointer ("DAT") or list pointer ("PRP"). Further, the data processor may associate the pointers with a host ID and/or VF ID ("RTNG"), and send the modified list of pointers 412 to the SSD. If the modified list of pointers 412 includes an additional list pointer, then the list of pointers associated with the additional list pointer may be further retrieved by the data processor at the request of the SSD in the manner described.

Example Apparatus

Figure 5:
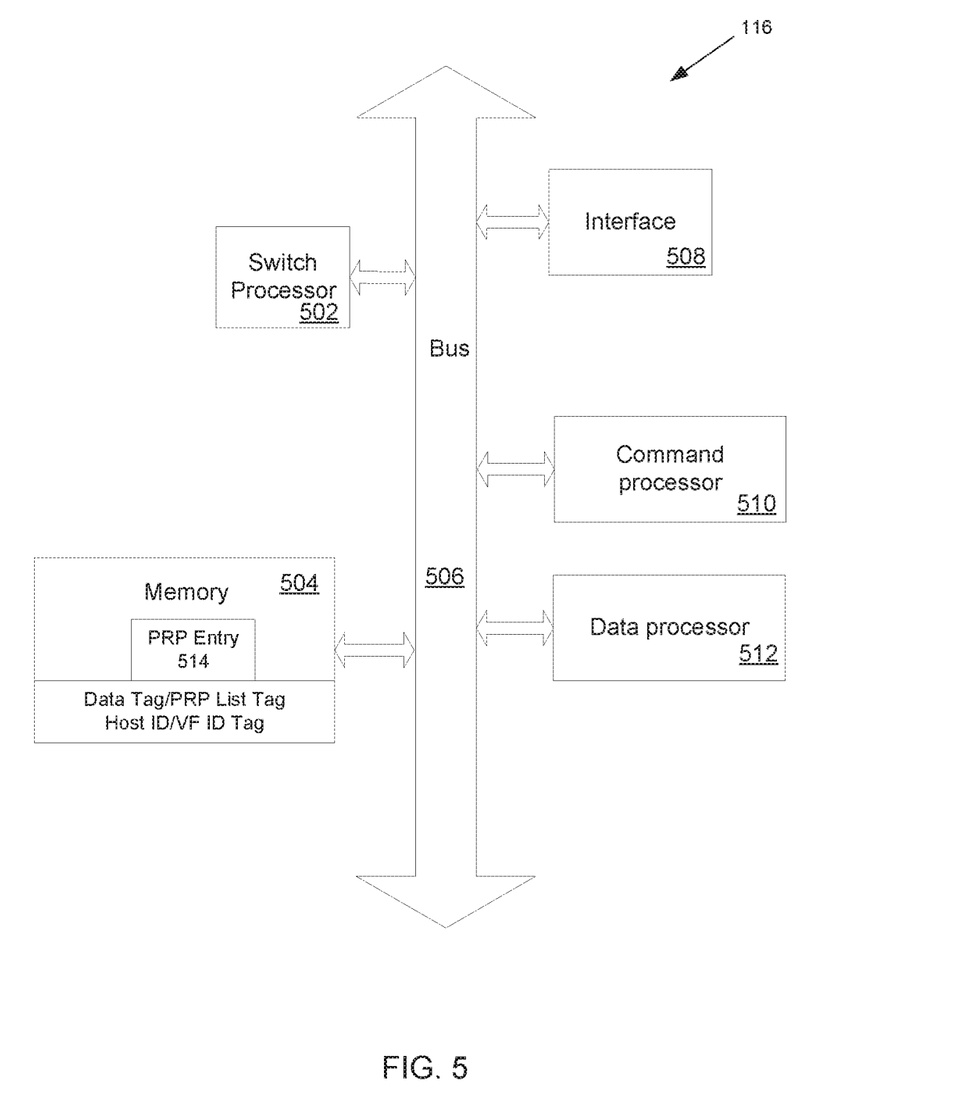
FIG. 5 is a simplified block diagram of an NVMe switch.

FIG. 5 is a simplified block diagram of the NVMe switch 116. The NVMe switch 116 includes a switch processor 502 (possibly including multiple processors, multiple cores, multiple nodes, and/or implementing multi-threading, etc.) that coordinates operations on the NVMe switch 116. The NVMe switch 116 includes memory 504. The memory 504 may be system memory (e.g., one or more of cache, random access memory (RAM), synchronous RAM (SRAM), dynamic RAM (DRAM), zero capacitor RAM, Twin Transistor RAM, embedded DRAM (eDRAM), extended data output RAM (EDO RAM), double data rate RAM (DDR RAM), electrically erasable programmable read only memory (EEPROM), Nano-RAM (NRAM), resistive RAM (RRAM), silicon-oxide-nitride-oxide-silicon memory (SONOS), parameter random access memory (PRAM), etc.) or any one or more other possible realizations of non-transitory machine-readable media/medium. In examples, the memory 504 may store a PRP entry 514 having a data tag or PRP list tag and routing information in the form of the host ID and/or VF ID associated with NVMe commands received from a host. The memory 504 may also store data associated with data pointers retrieved from a host and a list of pointers retrieved from a host.

The NVMe switch 116 also includes a bus 506 (e.g., Advanced Extensible Bus AXI Bus). Coupled to the bus 506 is interface 508 which facilitates communication with the non-volatile memory array of the SSD and the host. In this regard, the interface 508 may include the PCIe EP cluster and the PCIe RC cluster which provide communication to the hosts and SSDs, respectively.

The command processor 516 may implement any one of the previously described functionalities for tagging the PRP entries associated with an NVMe command with information associated with whether it is a data pointer or list pointer. The PRP entries may also be modified with a host ID of the physical host which sent the NVMe command and/or a VF ID of the virtual host or VM. The data processor 518 may implement any one of the previously described functionalities for routing a data pointer and/or list pointer to a host based on the host ID and/or VF ID in a modified PRP entry. These functions may be implemented in hardware and/or software (e.g., computer code, program instructions, program code, computer instructions) stored on a non-transitory machine readable medium/media. In some instances, the processor 502 and memory 504 may implement or facilitate implementing the functionalities instead of or in addition to the command processor 510 and data processor 512. Further, realizations can include fewer or additional components not illustrated in FIG. 5 (e.g., video cards, audio cards, additional network interfaces, peripheral devices, etc.). The processor 502 and the memory 504 are coupled to the bus 506. Although illustrated as being coupled to the bus 506, the memory 504 can be coupled to the processor 502.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method comprising:
   receiving at a non-volatile memory express switch a first command from a host of a storage system, wherein the first command comprises a first physical region page entry and a second physical region page entry and conforms to a non-volatile memory express standard, wherein the first physical region page entry includes a first data pointer, and wherein the second physical region page entry includes a second data pointer or a list pointer;
   modifying the first physical region page entry with a host identifier of the host;
   determining content to include in the second physical region page entry based on whether the second physical region page entry includes the second data pointer or the list pointer;
   modifying the second physical region page entry to include the determined content;
   sending, from the non-volatile memory express switch to a solid state drive, a second command with a plurality of entries, wherein the plurality of entries include the modified first physical region page entry and the modified second physical region page entry;
   receiving a memory request from the solid state drive at the non-volatile memory express switch, wherein the memory request comprises the plurality of entries; and
   routing the memory request from the non-volatile memory express switch to the host based on the host identifier in the memory request.

2. The method of claim 1, wherein receiving the memory request comprises receiving a peripheral computer interface express read request comprising the plurality of entries.

3. The method of claim 1, wherein the host identifier is inserted into an upper 2 octets of a peripheral computer interface express address of the first physical region page entry of the first command.

4. The method of claim 1, wherein modifying the first physical region page entry with the host identifier comprises:
   saving one or more bits of the first physical region page entry of the first command in a memory; and
   replacing the one or more bits of the first physical region page entry of the first command with the host identifier.

5. The method of claim 1, wherein the second physical region page entry of the first command includes the second data pointer.

6. The method of claim 1, further comprising modifying the second physical region page entry of the first command with an indication that the second physical region page entry of the first command includes the list pointer.

7. The method of claim 1, further comprising:
   determining whether the second physical request page entry is valid;
   if the second physical request page entry is valid, modifying the second physical request page entry to include a physical region page list tag directed to a list of data pointers; and
   if the second physical request page entry is not valid, modifying the second physical request page entry to include the host identifier.

8. The method of claim 7, wherein determining whether the second physical request page entry is valid is based on a size of a logical block address of the first command and an amount of data referred to by at least one of the first data pointer or the second data pointer.

9. The method of claim 1, further comprising:
   determining whether the first command requires accessing a list of data pointers;
   if the first command requires accessing a list of data pointers, modifying the second physical request page entry to include a physical region page list tag directed to a list of data pointers; and
   if the first command does not require accessing a list of data pointers, modifying the second physical request page entry to include the host identifier.

10. The method of claim 1, further comprising:
    determining whether a list pointer address offset of the second physical region page entry is equal to zero;
    if the list pointer address offset is equal to zero, modifying the second physical request page entry to include a physical region page list tag directed to a list of data pointers; and
    if the list pointer address offset is not equal to zero, accessing a physical region page list.

11. A non-transitory computer-readable medium storing instructions that, when executed by one or more processors, cause the one or more processors to at least:
    receive a first command from a host of a storage system, wherein the first command comprises a first physical region page entry and a second physical region page entry and conforms to a non-volatile memory express standard, wherein the first physical region page entry includes a first data pointer, and wherein the second physical region page entry includes a second data pointer or a list pointer;
    modify the first physical region page entry with a host identifier of the host;
    determine content to include in the second physical region page entry based on whether the second physical region page entry includes the second data pointer or the list pointer;
    modify the second physical region page entry to include the determined content;
    send a second command with a plurality of entries to a solid state drive, wherein the plurality of entries include the modified first physical region page entry and the modified second physical region page entry;
    receive a memory request from the solid state drive, wherein the memory request comprises the plurality of entries; and
    route the memory request to the host based on the host identifier in the memory request.

12. The non-transitory computer-readable medium of claim 11, wherein the instructions to receive the memory request comprise instructions to receive a peripheral computer interface express read request comprising the plurality of entries.

13. The non-transitory computer-readable medium of claim 11, wherein the host identifier is inserted into an upper 2 octets of a peripheral computer interface express address of the first physical region pane entry of the first command.

14. The non-transitory computer-readable medium of claim 11, wherein the host is a virtual host.

15. The non-transitory computer-readable medium of claim 11, wherein the instructions to modify the first physical region pare entry with the host identifier comprises instructions to:
    save one or more bits of the first physical region page entry of the first command in a memory; and
    replace the one or more bits of the first physical region page entry of the first command with the host identifier.

16. The non-transitory computer-readable medium of claim 11, wherein the second physical region page entry of the first command includes the second data pointer.

17. The non-transitory computer-readable medium of claim 11, further comprising instructions to modify the second physical region page entry of the first command with an indication that the second physical region pare entry of the first command includes a data pointer or list pointer.

18. A non-volatile memory express switch comprising:
    a command processor configured to
    receive a first command from a host of a storage system, wherein the first command comprises a first physical region page entry and a second physical region page entry and conforms to a non-volatile memory express standard;
    modify the first physical region page entry with a host identifier of the host;
    determine content to include in the second physical region page entry based on whether the second physical region page entry includes the second data pointer or the list pointer,
    modify the second physical region page entry to include the determined content,
    send a second command with a plurality of entries to a solid state drive, wherein the plurality of entries includes the modified first physical region page entry and the second physical region page entry,
    a memory request from the solid state drive, wherein the memory request comprises the plurality of entries and
    route the memory request to the host based on the host identifier in the memory request; and a data processor configured to route data from the host to the solid state drive based on the memory request.

19. The non-volatile memory express switch of claim 18, wherein the command processor is configured to, while receiving the memory request, receive a peripheral computer interface express read request comprising the plurality of entries.

20. The non-volatile memory express switch of claim 18, wherein:
  the host identifier is inserted into an upper 2 octets of a peripheral computer interface express address of the first physical region page entry of the first command; and
  the host is a virtual host.

21. The non-volatile memory express switch of claim 18, wherein the command processor is configured to, while modifying the first physical region page entry with the host identifier:
  save one or more bits of the first physical region page entry of the first command in a memory; and
  replace the one or more bits of the first physical region page entry of the first command with the host identifier.

22. The non-volatile memory express switch of claim 18, wherein the second physical region page entry of the first command includes a data pointer.

23. The non-volatile memory express switch of claim 18, wherein the command processor is configured to modify the second physical region page entry of the first command with an indication that the second physical region page entry of the first command includes a list pointer.

* * * * *